United States Patent [19]

Bae

[11] Patent Number: 5,559,607
[45] Date of Patent: Sep. 24, 1996

[54] APPARATUS FOR CONTROLLING REPRODUCTION SPEED FOR LASER DISC PLAYER

[75] Inventor: Hong-Moon Bae, Seoul, Rep. of Korea

[73] Assignee: Daewoo Electronics Co., Ltd., Seoul, Rep. of Korea

[21] Appl. No.: 311,107

[22] Filed: Sep. 23, 1994

[30] Foreign Application Priority Data

Sep. 25, 1993 [KR] Rep. of Korea .................. 93-19714

[51] Int. Cl.$^6$ ................................................. H04N 5/781
[52] U.S. Cl. ................................................. 358/342; 358/343
[58] Field of Search ............................... 358/342, 312, 358/335, 337, 330, 343; 369/32; 360/10.1, 33.7; H04N 5/781

[56] References Cited

U.S. PATENT DOCUMENTS

| | | | |
|---|---|---|---|
| 4,429,335 | 1/1984 | Sugiyama et al | 358/312 |
| 4,819,059 | 4/1989 | Pape | 358/312 |
| 4,847,701 | 7/1989 | Suesada | 358/312 |
| 4,858,030 | 8/1989 | Oku et al. | 358/342 |
| 4,864,428 | 9/1989 | Kanamaru | 358/342 |

*Primary Examiner*—Thai Q. Tran
*Assistant Examiner*—Huy Nguyen
*Attorney, Agent, or Firm*—Beveridge, DeGrandi, Weilacher & Young L.L.P.

[57] ABSTRACT

An apparatus for controlling the reproduction speed for laser disc player is disclosed. When audio and video signals recorded on a disc are reproduced by an optical pick-up, if an accelerating or decelerating signal is supplied from a speed controlling inputting part to a micro-processor, then the micro-processor outputs a speed control signal to the speed control part. The speed control part outputs a main clock (which is varied in accordance with the received control signal) to a video signal processing and pulse width modulation signal generating part. Then the video signal processing and pulse width modulation signal generating part outputs a modified spindle motor driving pulse width. Further, after receipt of the main clock, the video signal processing and pulse width modulation signal generating part supplies to an A/D converter the video signals which are extracted from the microwave signals which are outputted from the optical pick-up part. Then the A/D converter carries out a sampling on the received video signals based on A/D clocks to A/D convert them and to output them as digital data. The digital data signals are made to pass through an interpolator or a decimator to be outputted to the video signal processing part.

3 Claims, 4 Drawing Sheets

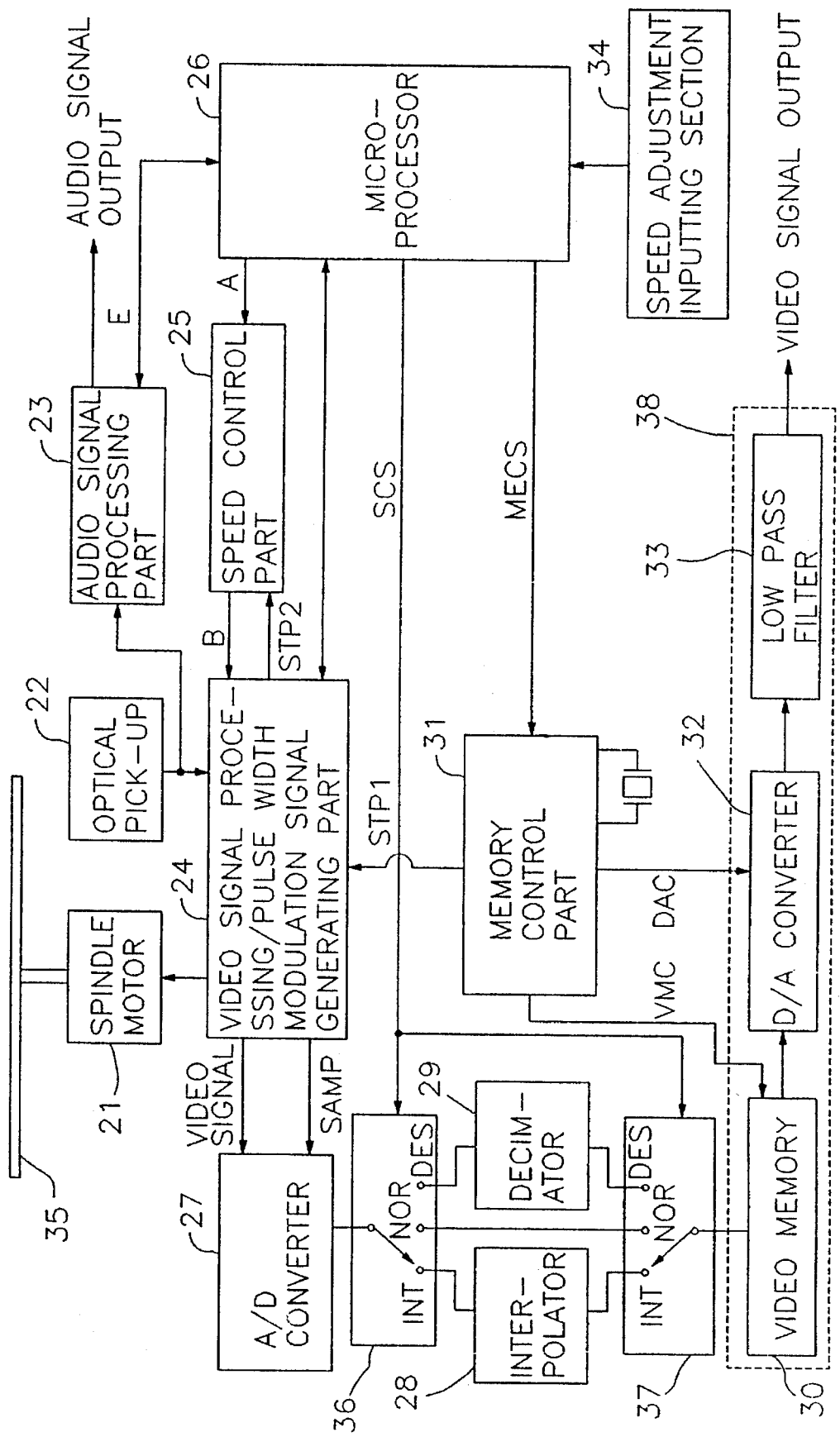

FIG.3A

| BIT1 | BIT2 | BIT3 |
|------|------|------|
| A | B | C |
| 0 | 0 | 0 |
| 0 | 0 | 0 |
| 0 | 1 | 0 |
| 0 | 1 | 1 |
| 1 | 0 | 0 |
| 1 | 0 | 1 |
| 1 | 1 | 0 |

SPCS1

SPCS2

SPCS3

FIG.3B

MAPS1

MAPS2

MAPS3

FIG.3C

PWM1

PWM2

PWM3

APPARATUS FOR CONTROLLING REPRODUCTION SPEED FOR LASER DISC PLAYER

BACKGROUND OF THE INVENTION

1. Field of the Invention

The present invention relates to an apparatus for controlling a reproduction speed for a laser disc player, in which the data recorded on a disc is reproduced while controlling the revolution of the spindle motor by means of driving pulses for the spindle motor.

2. Prior Arts

Generally, in laser discs of a constant linear velocity type, the rotation speed of the spindle motor should be about 1800 rpm in its inner circumference, and about 600 rpm in its outer circumference. Therefore, the recorded amount of data per unit inner track and per unit outer track are different from each other, with the result that it is difficult to control the rotation speed of the spindle motor during the variation of the reproduction speed.

Further, when a laser disc player carries out a low speed reproduction or a high speed reproduction for data in which the audio signals and the video signals are recorded on the laser disc in a standard type of a frequency modulation method, the signals have to be converted into the normal type again, this being a problem.

U.S. Pat. No. 4,864,428 discloses an apparatus for adjusting the reproduction speed for a laser disc player. This patent provides a technique for controlling the rotation speed of the spindle motor of a laser disc player in accordance with the difference in the phase and frequency between reference synchronizing signals and the signals read from the laser disc. FIG. 1 is a block diagram showing the constitution of the reproduction speed adjustable laser disc player of U.S. Pat. No. 4,864,428.

As shown in FIG. 1, in the reproduction speed adjustable laser disc player, a disc 1 is driven by a spindle motor 2, and the data recorded on disc 1 are read by an optical pick-up 3. The audio data which are read by optical pick-up 3 from disc 1 are amplified by a pre-amplifier 4, and then, are supplied to an audio demodulating circuit 5 to be demodulated before being supplied to an audio signal output terminal 6. Meanwhile, the video components are supplied to a video demodulating circuit 7 to be demodulated by it, and are supplied through a video memory 8 to a video output terminal 9. The output of video demodulating circuit 7 are also supplied to a synchronizing signal separating circuit 10 and to a write clock and address generating circuit 11.

Horizontal synchronizing signal separating circuit 10 separates and extracts the horizontal synchronizing signals from the video signals to send them to a spindle servo circuit 12. Spindle servo circuit 12 compares the received horizontal synchronizing signals with a reference signal of the variable frequency which is generated by a variable frequency signal generating circuit 17. The variable frequency reference signal is used as a reference signal in spindle servo circuit 12 which controls the rotation speed of disc 1.

Spindle servo circuit 12 detects the frequency and phase differences between the reference signal and the restored horizontal synchronizing signals so as to generate servo control signals which are varied in accordance with the detected frequency and phase differences. These servo control signals are used for controlling the driving of spindle motor 2 through driving circuit 14, so as to ultimately control the rotation speed of the disc.

In the apparatus of FIG. 1, the video data of disc 1 are stored into video memory 8 in a proper sequence in accordance with the write clocks and the address signals which are generated by write clock and address generating circuit 11 based on the reproduced video signals. The frequency of the video memory reading clocks which are generated by reference signal generating circuit 13 is decided in accordance with the reference signals, and therefore, the video signals which correspond to the television broadcasting standard appear on the video output terminal 9.

As for the audio signals of disc 1, their demodulated output is supplied directly from audio demodulating circuit 5 to audio output terminal 6, and therefore, the pitches of the audio signals are varied proportionately to the rotation speed of the disc.

However, in the spindle motor control method of FIG. 1 in which the speed of the spindle motor is controlled in accordance with the phase difference and the frequency difference between the reference synchronizing signals and the synchronizing signals read from the disc, an exact synchronization is not realized between the audio signals and the video signals, with the result that the picture reproducing speed and the audio reproducing speed do not correspond to each other.

Further, in the case where the reproducing speed is fast, the capacity of the video memory should be larger compared with the normal reproduction, with the result that the manufacturing cost is increased.

SUMMARY OF THE INVENTION

The object of the present invention is to provide an apparatus for controlling the reproduction speed for a laser disc player, in which even when the reproduction speed is varied, the audio signals and the video signals are precisely synchronized, so that sounds and pictures would be reproduced in a good corresponding manner.

To accomplish the above object of the present invention, there is provided an apparatus for controlling the reproduction speed for a laser disc player, including a speed controlling inputting part, a spindle motor driven by driving pulses, an optical pick-up part for reading out RF signals from a disc rotated by the spindle motor, and an audio signal processing part and a video signal processing part for detecting respectively audio signals and video signals from the RF signals read-out by the optical pick-up part, the apparatus comprising:

a control means for outputting a plurality of control signals in accordance with signals received from the speed controlling inputting part;

a memory control means for outputting control pulses to control a reference pulse and the video signal processing part upon receipt of a control signal from the control means;

a speed control means for outputting a main clock which is varied in accordance with an inputted control signal upon receipt of a control signal from the control means;

a video signal processing and pulse width modulation signal generating means for outputting a reference pulse same as the reference pulse received from the memory control means, video signals received from the optical pick-up part, a sampling pulse for sampling the video signals, and a spindle motor driving pulse for controlling a speed of the spindle motor;

an A/D converter for receiving video signals and sampling pulses from the video signal processing and pulse width modulation signal generating means to convert the video signals to digital data; and an interpolating and decreasing means for interpolating or decreasing an data amount of the digital data signals to control an output supplied to the video signal processing part.

According to the present invention, when the audio and video signals recorded on a disc which is rotated by a spindle motor are reproduced by an optical pick-up, if an accelerating or decelerating signal is supplied from a speed controlling input part to a micro-processor, then the micro-processor outputs a speed control signal to the speed control part. The speed control part outputs a main clock (which is varied in accordance with the received control signal) to a video signal processing and pulse width modulation signal generating part. Then the video signal processing and pulse width modulation signal generating part outputs a modified spindle motor driving pulse width. Further, after receipt of the main clock, the video signal processing and pulse width modulation signal generating part supplies to an A/D converter the video signals which are extracted from the microwave signals which are outputted from the optical pick-up part. Then the A/D converter carries out a sampling on the received video signals based on A/D clocks to A/D-convert them and to output them as digital data. The micro-processor discriminates the acceleration or deceleration for the signals which are supplied by a speed controlling input part. Based on the result of the discrimination, the switching part is controlled, and then, the digital data signals are made to pass an interpolator or a decimator to output them to the video signal processing part. Under this condition, an interpolating or decreasing is carried out on the data amount of the digital data signal. Accordingly, even when the reproduction speed is varied, the audio signals and the video signals are synchronized, with the result that the sounds and pictures are reproduced in a corresponding manner.

BRIEF DESCRIPTION OF THE DRAWINGS

The above objects and other advantages of the present invention will become more apparent by describing in detail a preferred embodiment thereof with reference to the attached drawings in which:

FIG. 2 is a block diagram showing a constitution of a laser disc player according to one embodiment of the present invention; and FIGS. 3 and 4 illustrate wave patterns of the signals generated from the different parts of FIG. 2.

DESCRIPTION OF THE PREFERRED EMBODIMENT

Figure 1:
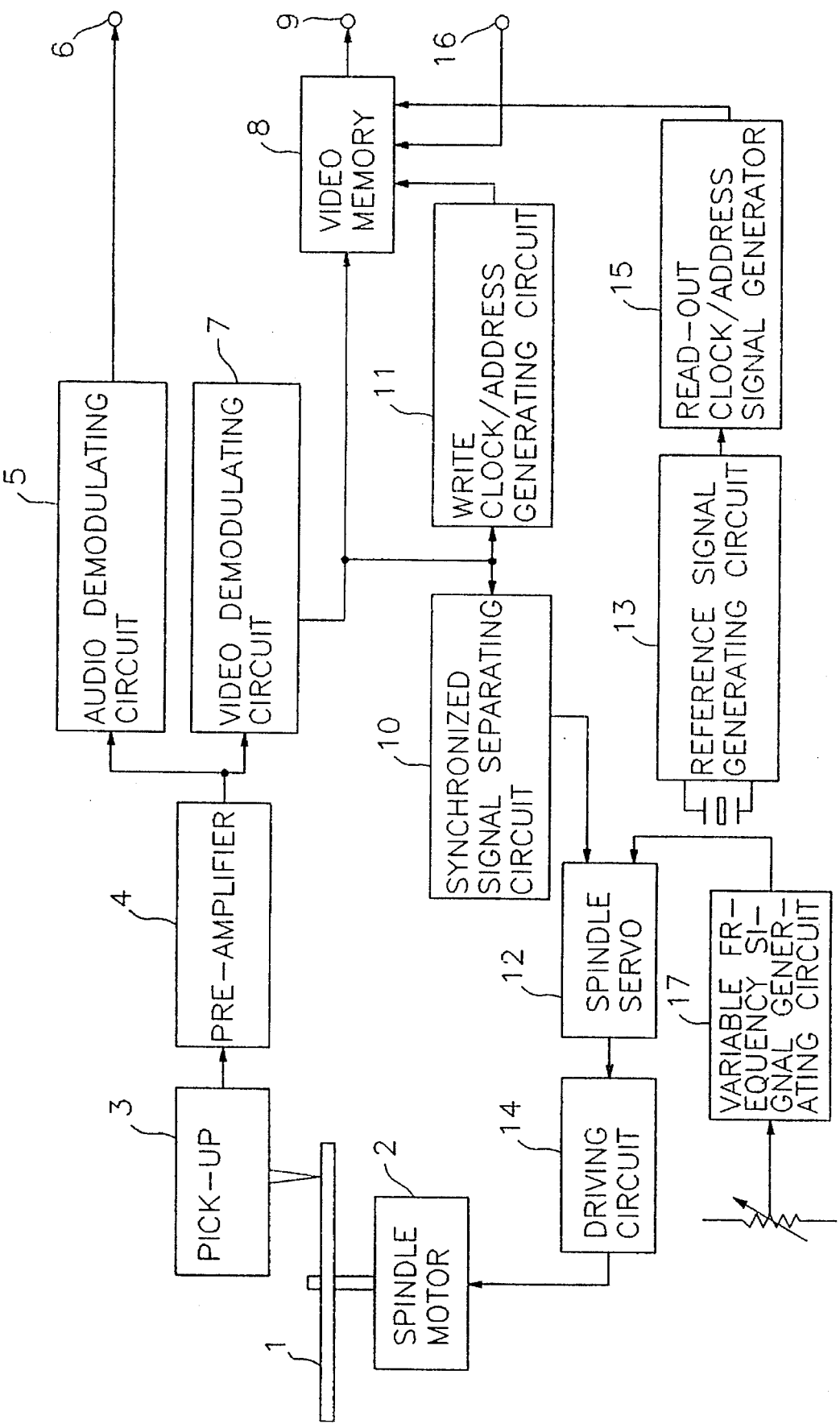
FIG. 1 is a block diagram showing a constitution of a conventional laser disc player.
Figure 4A:
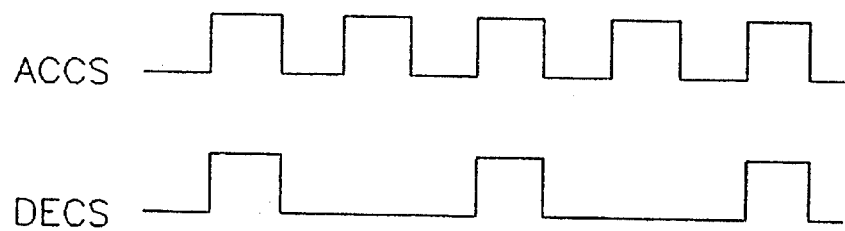
Figure 4B:
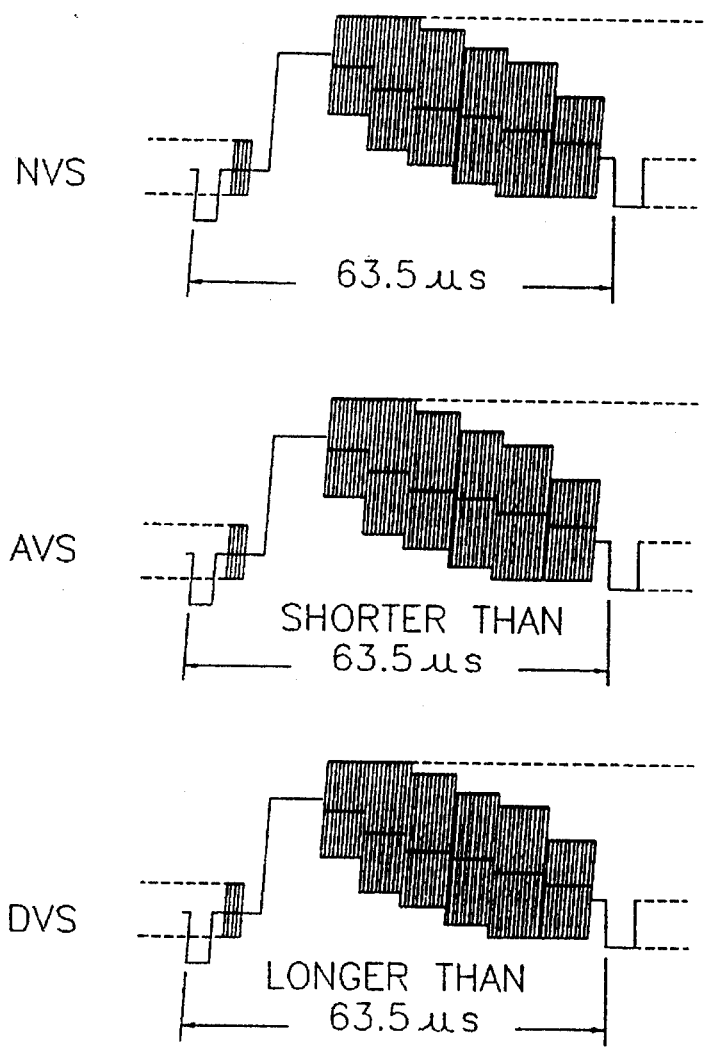

FIG. 2 is a block diagram showing a constitution of a laser disc player according to one embodiment of the present invention. FIGS. 3 and 4 illustrate wave patterns of the signals generated from the different parts of FIG. 2.

As shown in the drawings, if the power source is connected, a micro-processor 26 outputs a memory control signal (MECS). The MECS is used for activating a memory control part 31. Upon receipt of the MECS, memory control part 31 outputs video memory control (VMC) and digital-analogue control (DAC) signals, and a first reference pulse signal (STP1). The VMC and DAC signals control a D/A converter 32 and a video memory 30 of a video signal processing part 38, while the first reference pulse signal (STP1) is supplied to a video signal processing and pulse width modulation signal generating part 24. In accordance with the received first reference signal (STP1), video signal processing and pulse width modulation signal generating part 24 outputs a second reference signal (STP2) which is same as the first reference signal (STP1), and also outputs a sampling pulse (SAMP) for a sampling.

Under the normal reproduction speed, micro-processor 26 outputs a switching control signal (SCS), so that first and second switching parts 36 and 37 would be respectively connected to terminals NOR. For example, a speed control signal (SPCS1) which is illustrated in (A) of FIG. 3 is outputted through a line A to a speed control part 25. In accordance with the speed control signal (SPCS1), speed control part 25 outputs a signal e.g., a main clock (MAPS1) as shown in (B) of FIG. 3, through a line B to the video signal processing and pulse width modulation signal generating part 24. In accordance with the received main clock (MAPS1), video signal processing and pulse width modulation signal generating part 24 outputs a pulse, e.g., a spindle motor driving pulse (PWM1) as shown in (C) of FIG. 3 through a line D, so that the spindle motor would rotate at a normal speed.

At first when the power source is connected, a spindle motor driving pulse (PWM1) is outputted from the video signal processing and pulse width modulation signal generating part 24 through the line D, so that the apparatus for controlling the reproduction speed for a laser disc player would rotate spindle motor 21 at the normal speed. Therefore, the RF signals recorded on disc 35 are read by optical pick-up part 22 at a normal speed. The RF signals thus read are inputted respectively into audio signal processing part 23 and video signal processing and pulse width modulation signal generating part 24, from which audio signals and video signals (NVS) are outputted. The video signal (NVS) which is illustrated in (B) of FIG. 4 passes through video memory 30 of video signal processing part 38 of A/D converter 27 and D/A converter 32 so as to be reproduced.

Micro-processor 26 gives and receives clocks and data required for the current reproduction speed to and from audio signal processing part 23 and the video signal processing and pulse width modulation signal generating part 24.

During such as normal speed reproduction of the disc data, if there is a manipulation of an accelerating or decelerating buttons (not shown) of a speed controlling inputting part 34, micro-processor 26 senses the accelerating or decelerating signals through line G.

In the case where speed controlling inputting part 34 is first manipulated, micro-processor 26 senses the accelerating signal (ACCS) of (A) of FIG. 4 through line G, and then, outputs a switching signal (SCS), so that first and second switching parts 36 and 37 would be connected to the respective terminals (INT). Interpolator 28 is connected between the terminals (INT) of first and second switching parts 36 and 37.

Meanwhile, micro-processor 26 outputs for example a 3-bit code signal of (A) of FIG. 3 through line A to speed control part 25. Speed control part 25 frequency-divides its own pulses based on the frequency dividing constant which is decided by the bit value of the speed control signal (SPCS2), so that the frequency-divided pulse and the second reference pulse (STP2) of video signal processing and pulse width modulation signal generating part 24 would be phase-locked-loop(PLL)-synchronized to each other, and that a main clock (MAPS2) of (B) of FIG. 3 would be outputted through line B. This main clock (MAPS2) is outputted to the video signal processing and pulse width modulation signal generating part 24 and to audio signal processing part 23. Video signal processing and pulse width modulation signal generating part 24 outputs a spindle motor driving pulse signal (PWM2) of (C) of FIG. 3 through line D, thereby increasing the speed of the spindle motor. Therefore the video signal output of video signal processing and pulse width modulation signal generating part 24 which is based on the RF signals read by optical pick-up part 22 from disc 35 has the form of the video signal (AVS) as shown in (C) of FIG. 3.

The video signals (AVS) are supplied through line C to A/D converter 27, A/D converter 27 samples the received video signals (AVS) based on the sampling pulse (SAMP), and A/D converts to output them in the form of digital data signals. These outputted digital data signals are interpolated through interpolator 28, and then, are made to pass through video signal processing part 38 to be outputted in the form of analogue video signals.

Meanwhile, during the time when RF signals recorded on the disc are reproduced at the normal speed, if a deceleration button of speed controlling inputting part 34 is pressed, then micro-processor 26 senses a deceleration signal (DECS) of (A) of FIG. 4 through the line G, and outputs a switching signal (SCS), so that first and second switching parts 36 and 37 would be connected to terminals (DES) respectively. Decimator 29 is connected between the terminals (DES) of first and second switching parts 36 and 37.

Meanwhile, micro-processor 26 outputs for example a 3-bit code signal of (A) of FIG. 3 through the line A to speed control part 25. Speed control part 25 frequency-divides its own pulse based on a frequency dividing constant which is decided by the bit value of the speed control signal (SPCS3), so that the frequency-divided pulse and the second reference pulse STP2 of video signal processing and pulse width modulation signal generating part 24 would be PLL-synchronized with each other, and that it would be outputted through the line B in the form of the main clock MAPS3 of (B) of FIG. 3. This main clock (MAPS3) is outputted to video signal processing and pulse width modulation signal generating part 24 and to audio signal processing part 23. Video signal processing and pulse width modulation signal generating part 24 outputs a spindle motor driving signal (PWM3) of (C) of FIG. 3, thereby decreasing the speed of spindle motor 21. Therefore, the video signal output of video signal processing and pulse width modulation signal generating part 24 (after the RF signals are read from disc 35 by optical pick-up part 22) has the form of video signal (DVS) of (C) of FIG. 3.

These video signals (DVS) are inputted through the line C to A/D converter 27. A/D converter 27 samples the received video signals (DVS) based on the sampling pulse (SAMP), and A/D converts to output them in the form of digital data. These outputted digital data undergo a reduction of the data amount while passing through decimator 29, and they pass through video signal processing part 38 to be outputted in the form of analogue signals.

According to the present invention as described above, the constitution and action of the present invention makes it possible to interpolate or decrease the data amount, and therefore, the apparatus for controlling the reproduction speed for a laser disc player according to the present invention makes the audio signals and the video signals correspond with each other, even if the reproduction speed is varied, with the result that the sounds and pictures are reproduced in a well corresponding manner.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In an apparatus for controlling the reproduction speed for a laser disc player, including a speed controlling inputting part, a spindle motor driven by driving pulses, an optical pick-up part for reading out RF signals from a disc rotated by said spindle motor, and an audio signal processing part and a video signal processing part for detecting respectively audio signals and video signals from the RF signals read-out by said optical pick-up part, said apparatus further comprising:

a control means for outputting a plurality of control signals in accordance with signals received from said speed controlling inputting part;

a memory control means for outputting control pulses to control a reference pulse and said video signal processing part upon receipt of a control signal from said control means;

a speed control means for outputting a main clock which is varied in accordance with an inputted control signal upon receipt of a control signal from said control means;

a video signal processing and pulse width modulation signal generating means for outputting a reference pulse same as the reference pulse received from said memory control means, video signals received from said optical pick-up part, a sampling pulse for sampling said video signals, and a spindle motor driving pulse for controlling a speed of said spindle motor;

an A/D converter for receiving video signals and sampling pulses from said video signal processing and pulse width modulation signal generating means to convert said video signals to digital data; and an interpolating and decreasing means for interpolating or decreasing an data amount of the digital data signals to control an output supplied to said video signal processing part, wherein said data amount interpolating and decreasing means comprises an interpolator, a decimator, and first and second switching parts, and said data amount interpolating and decreasing means controls in such a manner that said A/D convertor video signals converted by means of said interpolator or said decimator should be outputted to said video signal processing part in accordance with the spindle motor accelerating or decelerating signals from said speed controlling inputting part, and in accordance with the control signals of said control means.

2. The apparatus as claimed in claim 1, wherein one of said plurality of control signals of said control means inputted to said speed control means is a 3-bit code digital signal.

3. The apparatus as claimed in claim 1, wherein said main clock is a self-generated pulse which is frequency-divided based on a frequency-dividing constant which is determined in accordance with a value of said 3-bit code digital signal inputted into said control means, and said main clock is outputted in synchronization with the reference pulse of said video signal processing and pulse width modulation signal generating means.

* * * * *